(12) United States Patent
Sato et al.

(10) Patent No.: US 8,773,816 B1
(45) Date of Patent: Jul. 8, 2014

(54) SPINDLE MOTOR WITH HYDRODYNAMIC BEARING STRUCTURE HAVING CAPILLARY SEAL AND DISK DRIVE APPARATUS INCLUDING SAME

(71) Applicant: Nidec Corporation, Kyoto (JP)

(72) Inventors: Kazuhiro Sato, Kyoto (JP); Masahiro Shiraishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/798,857

(22) Filed: Mar. 13, 2013

(51) Int. Cl.
*G11B 19/20* (2006.01)
*F16C 32/06* (2006.01)
*H02K 5/16* (2006.01)

(52) U.S. Cl.
USPC .......................... 360/99.08; 384/107; 310/90

(58) Field of Classification Search
CPC .... F16C 33/107; F16C 17/107; F16C 33/745; F16C 33/103; F16C 33/1085; F16C 17/026; F16C 33/74; F16C 17/045; F16C 17/10; F16C 2240/40; G11B 19/2036; G11B 19/2018; G11B 25/043; G11B 19/2009; G11B 33/08; G11B 19/2045; G11B 33/1473
USPC .................. 360/99.08, 99.04, 98.07; 310/90, 310/156.01; 384/107, 114
See application file for complete search history.

(56) References Cited

U.S. PATENT DOCUMENTS

| | | | |
|---|---|---|---|
| 5,533,811 A | 7/1996 | Polch et al. | |
| 5,558,443 A | 9/1996 | Zang | |
| 6,154,339 A * | 11/2000 | Grantz et al. | 360/99.08 |
| 6,211,592 B1 | 4/2001 | Ichiyama | |
| 6,246,136 B1 | 6/2001 | Ichiyama | |
| 7,290,933 B2 * | 11/2007 | Braun et al. | 384/107 |
| 7,726,882 B2 * | 6/2010 | Parsoneault et al. | 384/132 |
| 8,292,506 B2 * | 10/2012 | Gotoh et al. | 384/107 |
| 8,308,365 B2 * | 11/2012 | Aiello et al. | 384/107 |
| 2004/0090702 A1 | 5/2004 | Aiello et al. | |

(Continued)

FOREIGN PATENT DOCUMENTS

| | | |
|---|---|---|
| JP | 06-028335 U | 4/1994 |
| JP | 06-121484 A | 4/1994 |

(Continued)

OTHER PUBLICATIONS

Kimura et al., "Dynamic Pressure Bearing and Spindle Motor Using the Same", U.S. Appl. No. 12/952,223, filed Nov. 23, 2010.

(Continued)

*Primary Examiner* — Brian Miller
(74) *Attorney, Agent, or Firm* — Keating & Bennett, LLP

(57) ABSTRACT

A lubricating oil is arranged between stationary and rotating portions of a spindle motor. When the motor is stationary, upper and lower surfaces of the lubricating oil are respectively located in upper and lower capillary seal portions. A first angle defined between an outer circumferential surface of the plate portion and an inner circumferential surface of a cylindrical portion at the upper capillary seal portion, and a second angle defined between an outer circumferential surface of a sleeve and an inner circumferential surface of the wall portion at the lower capillary seal portion, in a section taken along a plane including a central axis is respectively in the range of about 1 degree to about 8 degrees and in the range of about 1 degree to about 10 degrees, respectively. The upper capillary seal portion has maximum radial and axial dimensions smaller than those of the lower capillary seal portion.

15 Claims, 6 Drawing Sheets

(56) References Cited

U.S. PATENT DOCUMENTS

| | | |
|---|---|---|
| 2004/0096131 A1 | 5/2004 | Aiello et al. |
| 2004/0156568 A1 | 8/2004 | Woldemar et al. |
| 2004/0165797 A1 | 8/2004 | Oku et al. |
| 2004/0175062 A1 | 9/2004 | Nishimura et al. |
| 2005/0031237 A1 | 2/2005 | Gomyo et al. |
| 2005/0111769 A1 | 5/2005 | Haga |
| 2005/0225187 A1 | 10/2005 | Hafen et al. |
| 2006/0002638 A1 | 1/2006 | Ichiyama |
| 2006/0002641 A1 | 1/2006 | Ichiyama |
| 2006/0039634 A1 | 2/2006 | Ichiyama |
| 2006/0039636 A1 | 2/2006 | Ichiyama |
| 2006/0051001 A1 | 3/2006 | Nishimura et al. |
| 2006/0147133 A1* | 7/2006 | Saichi .............. 384/100 |
| 2006/0210205 A1 | 9/2006 | Engesser et al. |
| 2006/0222276 A1 | 10/2006 | Uenosono |
| 2007/0140606 A1 | 6/2007 | Feng et al. |
| 2007/0154123 A1 | 7/2007 | Gomyo et al. |
| 2007/0177832 A1 | 8/2007 | Gotoh et al. |
| 2007/0211971 A1 | 9/2007 | Obara et al. |
| 2008/0006332 A1 | 1/2008 | Ishizawa et al. |
| 2008/0056104 A1 | 3/2008 | Nishimura et al. |
| 2008/0101739 A1* | 5/2008 | Wildpreth et al. ............ 384/110 |
| 2009/0129710 A1 | 5/2009 | Ito et al. |
| 2009/0140587 A1 | 6/2009 | Popov et al. |
| 2009/0140588 A1 | 6/2009 | Drautz et al. |
| 2009/0279818 A1 | 11/2009 | Le et al. |
| 2010/0124387 A1 | 5/2010 | Fuss et al. |
| 2010/0226601 A1* | 9/2010 | Inazuka et al. ................ 384/107 |
| 2010/0239194 A1* | 9/2010 | Kodama ........................ 384/107 |
| 2011/0026163 A1* | 2/2011 | Komori et al. ............. 360/234.1 |
| 2011/0064341 A1* | 3/2011 | Mizuno et al. ................ 384/114 |
| 2011/0279925 A1* | 11/2011 | Watanabe et al. .......... 360/99.08 |
| 2012/0063030 A1* | 3/2012 | Yamada et al. ............ 360/99.08 |
| 2012/0183243 A1* | 7/2012 | Sugiki .......................... 384/107 |
| 2013/0234552 A1* | 9/2013 | Kodama et al. ................ 310/90 |

FOREIGN PATENT DOCUMENTS

| | | |
|---|---|---|
| JP | 07-336924 A | 12/1995 |
| JP | 2002-005171 A | 1/2002 |
| JP | 2003-092867 A | 3/2003 |
| JP | 2003-244886 A | 8/2003 |
| JP | 2004-173377 A | 6/2004 |
| JP | 2005-048890 A | 2/2005 |
| JP | 2006-226388 A | 8/2006 |
| JP | 2009-041671 A | 2/2009 |
| JP | 2009-133361 A | 6/2009 |
| JP | 2011-002024 A | 1/2011 |
| WO | 2006/120719 A1 | 11/2006 |

OTHER PUBLICATIONS

Kimura et al., "Bearing Apparatus, Spindle Motor, and Disk Drive Apparatus", U.S. Appl. No. 12/791,147, filed Jun. 1, 2010.
Oe et al., "Bearing Apparatus, Spindle Motor, and Disk Drive Apparatus", U.S. Appl. No. 12/793,851, filed Jun. 4, 2010.
Yamada et al., "Fluid Dynamic Bearing Apparatus, Spindle Motor, and Disk Drive Apparatus", U.S. Appl. No. 12/742,931, filed May 14, 2010.
Yamada et al., "Fluid Dynamic Bearing Apparatus, Spindle Motor, and Disk Drive Apparatus", U.S. Appl No. 12/899,658, filed Oct. 7, 2010.
Yamada et al., "Fluid Dynamic Bearing Apparatus, Spindle Motor, and Disk Drive Apparatus", U.S. Appl. No. 13/299,542, filed Nov. 18, 2011.
Kimura et al., "Bearing Apparatus, Spindle Motor, and Disk Drive Apparatus", U.S. Appl. No. 13/602,420, filed Sep. 4, 2012.
Kimura et al., "Bearing Apparatus, Spindle Motor, and Disk Drive Apparatus", U.S. Appl. No. 13/681,500, filed Nov. 20, 2012.
Kimura et al., "Bearing Apparatus, Spindle Motor, and Disk Drive Apparatus", U.S. Appl. No. 13/602,348, filed Sep. 4, 2012.
Iwasaki et al., "Motor and Disk Drive Apparatus", U.S. Appl. No. 13/613,109, filed Sep. 13, 2012.
Tamaoka et al., "Motor and Disk Drive Apparatus", U.S. Appl. No. 13/613,106, filed Sep. 13, 2012.
Iwasaki et al., "Motor and Disk Drive Apparatus", U.S. Appl. No. 13/613,108, filed Sep. 13, 2012.
Sekii et al., "Spindle Motor and Disk Drive Apparatus", U.S. Appl. No. 13/767,205, filed Feb. 14, 2013.
Sekii et al., "Bearing Apparatus, Spindle Motor, and Disk Drive Apparatus", U.S. Appl. No. 13/789,796, filed Mar. 8, 2013.
Sekii et al., "Bearing Apparatus, Spindle Motor, and Disk Drive Apparatus", U.S. Appl. No. 13/790,089, filed Mar. 8, 2013.
Fukushima, "Motor and Disk Drive Apparatus," U.S. Appl. No. 13/751,380, filed Jan. 28, 2013.
Sekii, "Motor and Disk Drive Apparatus", U.S. Appl. No. 13/886,290, filed May 3, 2013.
Watanabe et al., "Spindle Motor and Disk Drive Apparatus", U.S. Appl. No. 13/898,921, filed May 21, 2013.
Kimura et al., "Bearing Mechanism, Motor, and Disk Drive Apparatus", U.S. Appl. No. 13/775,475, filed Feb. 25, 2013.
Sumiji et al., "Bearing Mechanism, Motor, and Disk Drive Apparatus", U.S. Appl. No. 13/775,467, filed Feb. 25, 2013.
Sumiji et al., "Bearing Mechanism, Motor, and Disk Drive Apparatus", U.S. Appl. No. 13/785,297, filed Mar. 5, 2013.
English translation of Official Communication issued in International Patent Application No. PCT/JP2009/059556, mailed on Jan. 20, 2011.

* cited by examiner

SPINDLE MOTOR WITH HYDRODYNAMIC BEARING STRUCTURE HAVING CAPILLARY SEAL AND DISK DRIVE APPARATUS INCLUDING SAME

BACKGROUND OF THE INVENTION

1. Field of the Invention

The present invention relates to a spindle motor and a disk drive apparatus.

2. Description of the Related Art

Spindle motors arranged to rotate disks about central axes thereof are typically installed in hard disk apparatuses and optical disk apparatuses. Such spindle motors include a stationary portion fixed to a housing of the apparatus and a rotating portion arranged to rotate while supporting the disk(s). The spindle motor is arranged to produce a torque centered on the central axis by magnetic flux generated between the stationary and rotating portions, whereby the rotating portion is caused to rotate with respect to the stationary portion.

The stationary and rotating portions of the spindle motor are joined to each other through a bearing apparatus. In recent years, in particular, spindle motors have often been provided with a bearing apparatus in which a lubricating oil is arranged between the stationary and rotating portions. As an example of a bearing apparatus including the lubricating oil, US 2010/0321823 describes a bearing apparatus in which the lubricating oil is arranged between a shaft and a rotating member supported to be rotatable relative to the shaft.

In some bearing apparatuses including the lubricating oil, two surfaces, i.e., upper and lower surfaces, of the lubricating oil are defined as in the bearing apparatus described in US 2010/0321823.

In the case of such a bearing apparatus, it is desirable that the levels of both the upper and lower surfaces of the lubricating oil be measured to control the amount of the lubricating oil injected into the bearing apparatus at the time of injection of the lubricating oil. However, measuring the level of one of the upper and lower surfaces of the lubricating oil may be difficult because of the structure of the bearing apparatus. In the bearing apparatus described in US 2010/0321823, for example, a lower capillary seal portion is defined by an inner circumferential surface of a thrust cup and an outer circumferential surface of a sleeve portion of a hub, and therefore, it is impossible to check the lower surface of the lubricating oil in the lower capillary seal portion through visual inspection at the time of the injection of the lubricating oil. That is, it is impossible to measure the level of the lower surface of the lubricating oil. This makes it necessary to control the amount of the lubricating oil injected into the bearing apparatus based on only the level of the upper surface of the lubricating oil.

Moreover, in recent years, the thickness of spindle motors, in particular, has been decreasing. There has accordingly been a demand for reductions in both axial and radial dimensions of capillary seal portions. For example, a reduction in the thickness of the bearing apparatus described in US 2010/0321823 requires reductions in both the axial and radial dimensions of the capillary seal portions. This will decrease the size of a margin portion of each capillary seal portion which accommodates a variation in the level of the surface of the lubricating oil in the capillary seal portion. This leads to a possibility that a leakage of the lubricating oil out of the spindle motor will be caused by a fluctuation in the level of any surface of the lubricating oil when the spindle motor is running or by an external shocking force when the spindle motor is in a stationary state.

SUMMARY OF THE INVENTION

A spindle motor according to a preferred embodiment of the present invention includes a stationary portion and a rotating portion. The stationary portion includes a shaft arranged to extend along a central axis extending in a vertical direction. The rotating portion is supported to be rotatable about the central axis around the shaft. The stationary portion includes the shaft, a circular plate portion, a wall portion, and a plate portion. The circular plate portion is arranged to extend radially outward from the shaft. The wall portion is cylindrical or substantially cylindrical and is arranged to extend upward from an outer edge of the circular plate portion. The plate portion is in or substantially in a shape of a circular ring, and is arranged to surround the shaft above the circular plate portion. The rotating portion includes a sleeve including an annular portion, a cylindrical portion, and a communicating hole. The annular portion preferably has a circular or substantially circular ring shape. The cylindrical portion is arranged to extend upward from an outer edge of the annular portion. The communicating hole is arranged to pass through the annular portion in an axial direction. An outer circumferential surface of the plate portion is arranged opposite to an inner circumferential surface of the cylindrical portion with an upper capillary seal portion defined therebetween. The upper capillary seal portion is arranged to gradually decrease in radial width with decreasing height. An outer circumferential surface of the sleeve is arranged opposite to an inner circumferential surface of the wall portion with a lower capillary seal portion defined therebetween. The lower capillary seal portion is arranged to gradually decrease in radial width with decreasing height. Between the stationary and rotating portions, a lubricating oil is arranged in a space including the upper capillary seal portion, a first gap, a second gap, a third gap, the communicating hole, and the lower capillary seal portion. The first gap is defined between a lower surface of the plate portion and an upper surface of the sleeve. The second gap is defined between an outer circumferential surface of the shaft and an inner circumferential surface of the sleeve. The third gap is defined between a lower surface of the sleeve and an upper surface of the circular plate portion. The communicating hole is arranged to bring the first and third gaps into axial communication with each other. An upper surface of the lubricating oil is located in the upper capillary seal portion when the spindle motor is in a stationary state. A lower surface of the lubricating oil is located in the lower capillary seal portion when the spindle motor is in the stationary state. A first angle defined between the outer circumferential surface of the plate portion and the inner circumferential surface of the cylindrical portion at the upper capillary seal portion in a section taken along a plane including the central axis is preferably in a range of about 1 degree to about 8 degrees, for example. A second angle defined between the outer circumferential surface of the sleeve and the inner circumferential surface of the wall portion at the lower capillary seal portion in a section taken along the plane including the central axis is preferably in a range of about 1 degree to about 10 degrees, for example. The upper capillary seal portion is arranged to have a maximum radial width smaller than that of the lower capillary seal portion. The upper capillary seal portion is arranged to have an axial length smaller than that of the lower capillary seal portion.

According to the above-described preferred embodiment of the present invention, a reduction in the likelihood that the lubricating oil will leak through any capillary seal portion is achieved.

3

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a spindle motor is referred to by the term "axial direction", "axial", or "axially", that directions perpendicular or substantially perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that a vertical direction is the axial direction, and that a side on which a stator unit is arranged with respect to a base portion is defined as an upper side. The shape of each member or portion and relative positions of different members or portions will be described based on the above assumptions. It should be noted, however, that the above definitions of the vertical direction and the upper and lower sides are not meant to restrict in any way the orientation of a spindle motor or a disk drive apparatus according to any preferred embodiment of the present invention when in use.

Also note that the term "parallel" as used herein includes both parallel and substantially parallel directions. Also note that the term "perpendicular" as used herein includes both perpendicular and substantially perpendicular directions.

Figure 1:
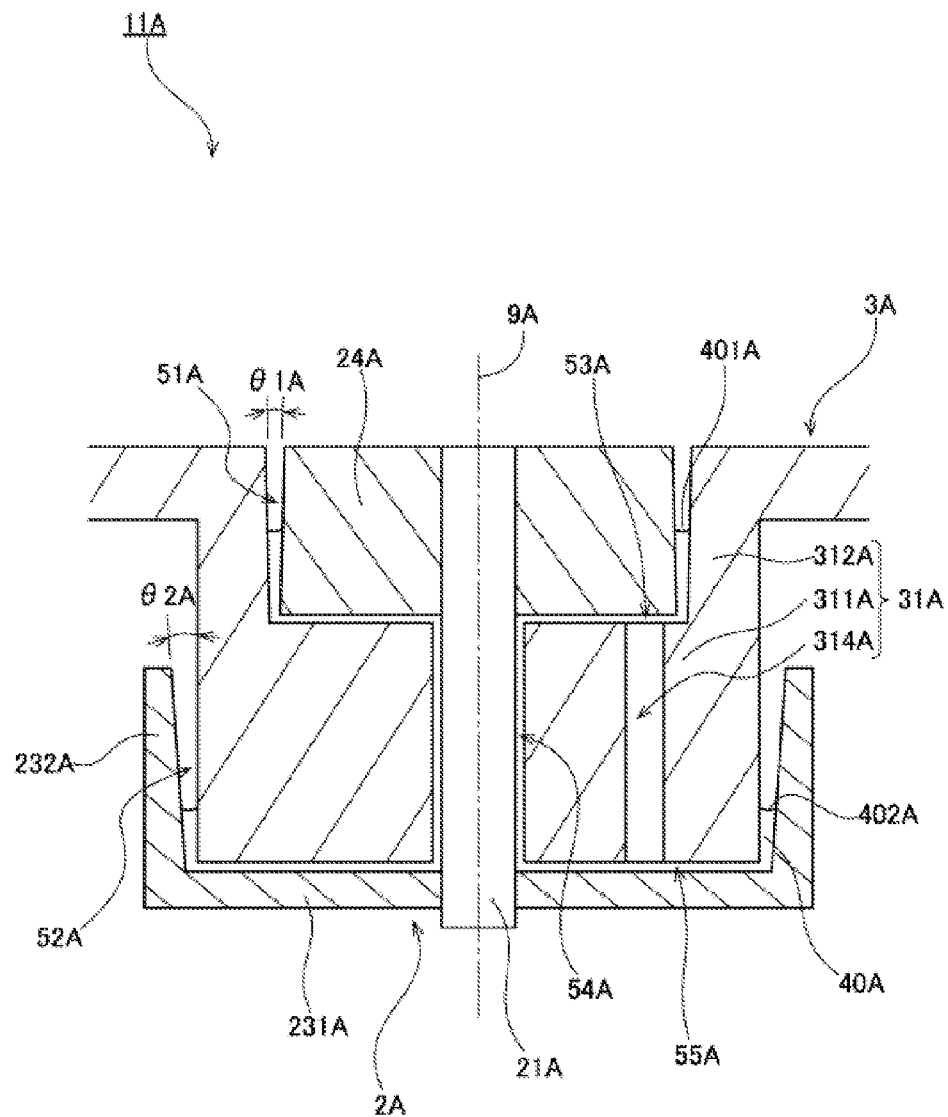
FIG. 1 is a partial vertical cross-sectional view of a spindle motor according to a first preferred embodiment of the present invention.

FIG. 1 is a partial cross-sectional view of a spindle motor 11A according to a first preferred embodiment of the present invention.

Referring to FIG. 1, the spindle motor 11A includes a stationary portion 2A and a rotating portion 3A.

The stationary portion 2A preferably includes a shaft 21A, a circular plate portion 231A, a wall portion 232A, and a plate portion 24A. The shaft 21A is arranged to extend along a central axis 9A extending in the vertical direction. The circular plate portion 231A is arranged to extend radially outward from the shaft 21A. The wall portion 232A is arranged to extend upward from an outer edge of the circular plate portion 231A to assume a cylindrical or substantially cylindrical shape. The plate portion 24A is arranged to surround the shaft 21A above the circular plate portion 231A. In addition, the plate portion 24A preferably has a circular or substantially circular ring shape.

The rotating portion 3A is supported to be rotatable about the central axis 9A around the shaft 21A. The rotating portion 3A includes a sleeve 31A. The sleeve 31A preferably includes an annular portion 311A, a cylindrical portion 312A, and a communicating hole 314A. The annular portion 311A preferably has a circular or substantially circular ring shape. The cylindrical portion 312A is arranged to extend upward from an outer edge of the annular portion 311A. The communicating hole 314A is arranged to pass through the annular portion 311A in the axial direction.

An outer circumferential surface of the plate portion 24A is preferably arranged opposite to an inner circumferential surface of the cylindrical portion 312A with an upper capillary seal portion 51A defined therebetween. That is, the outer circumferential surface of the plate portion 24A and the inner circumferential surface of the cylindrical portion 312A of the sleeve 31A are arranged to together define the upper capillary seal portion 51A. The upper capillary seal portion 51A is arranged to gradually decrease in radial width with decreasing height.

An outer circumferential surface of the sleeve 31A is preferably arranged opposite to an inner circumferential surface of the wall portion 232A with a lower capillary seal portion 52A defined therebetween. That is, the outer circumferential surface of the sleeve 31A and the inner circumferential surface of the wall portion 232A are arranged to together define the lower capillary seal portion 52A. The lower capillary seal portion 52A is arranged to gradually decrease in radial width with decreasing height.

Referring to FIG. 1, a lower surface of the plate portion 24A and an upper surface of the sleeve 31A are preferably arranged to together define a first gap 53A therebetween. An outer circumferential surface of the shaft 21A and an inner circumferential surface of the sleeve 31A are preferably arranged to together define a second gap 54A therebetween. A lower surface of the sleeve 31A and an upper surface of the circular plate portion 231A are preferably arranged to together define a third gap 55A therebetween. The first and third gaps 53A and 55A are arranged to be in axial communication with each other through the communicating hole 314A.

A lubricating oil 40A is arranged in a minute gap defined between the sleeve 31A and a combination of the shaft 21A, the circular plate portion 231A, the wall portion 232A, and the plate portion 24A. That is, the lubricating oil 40A is preferably arranged in a space including the upper capillary seal portion 51A, the first gap 53A, the second gap 54A, the third gap 55A, the communicating hole 314A, and the lower capillary seal portion 52A between the stationary and rotating portions 2A and 3A. An upper surface 401A of the lubricating oil 40A is preferably located in the upper capillary seal portion 51A when the spindle motor 11A is in a stationary state. Meanwhile, a lower surface 402A of the lubricating oil 40A is preferably located in the lower capillary seal portion 52A when the spindle motor 11A is in the stationary state.

Referring to FIG. 1, an angle defined between the outer circumferential surface of the plate portion 24A and the inner circumferential surface of the cylindrical portion 312A at the upper capillary seal portion 51A in a section taken along a plane including the central axis 9A is referred to as a first angle θ1A. Similarly, an angle defined between the outer circumferential surface of the sleeve 31A and the inner circumferential surface of the wall portion 232A at the lower capillary seal portion 52A in a section taken along the plane including the central axis 9A is referred to as a second angle θ2A. The first angle θ1A is preferably in a range of about 1 degree to about 8 degrees, for example. Meanwhile, the second angle θ2A is preferably in a range of about 1 degree to about 10 degrees, for example.

This arrangement preferably makes both the range of variation in the level of the upper surface 401A in the upper capillary seal portion 51A and the range of variation in the level of the lower surface 402A in the lower capillary seal portion 52A small. Accordingly, this makes it possible to secure a sufficient margin portion between the upper surface 401A and an upper end portion of the upper capillary seal portion 51A and a sufficient margin portion between the lower surface 402A and an upper end portion of the lower capillary seal portion 52A even when the axial thickness of the spindle motor 11A is reduced. This reduces the likelihood that a leakage of the lubricating oil 40A through the upper capillary seal portion 51A or the lower capillary seal portion 52A will be caused by a fluctuation in the level of either surface of the lubricating oil 40A when the spindle motor 11A is running or by an external shocking force when the spindle motor 11A is in the stationary state.

In particular, in the spindle motor 11A, the upper capillary seal portion 51A is arranged to have a maximum radial width smaller than that of the lower capillary seal portion 52A. In addition, the upper capillary seal portion 51A is arranged to have an axial length smaller than that of the lower capillary seal portion 52A.

This makes the range of variation in the level of the lower surface 402A in the lower capillary seal portion 52A smaller than the range of variation in the level of the upper surface 401A in the upper capillary seal portion 51A such that the size of the margin portion in the lower capillary seal portion 52A is made larger. In addition, it is possible to recognize the level of the upper surface 401A in the upper capillary seal portion 51A through visual inspection, measurement, or the like at the time of injection of the lubricating oil 40A. Therefore, the likelihood that the lubricating oil 40A will leak through the lower capillary seal portion 52A can be reduced by simply controlling the level of the upper surface 401A in the upper capillary seal portion 51A.

Figure 2:
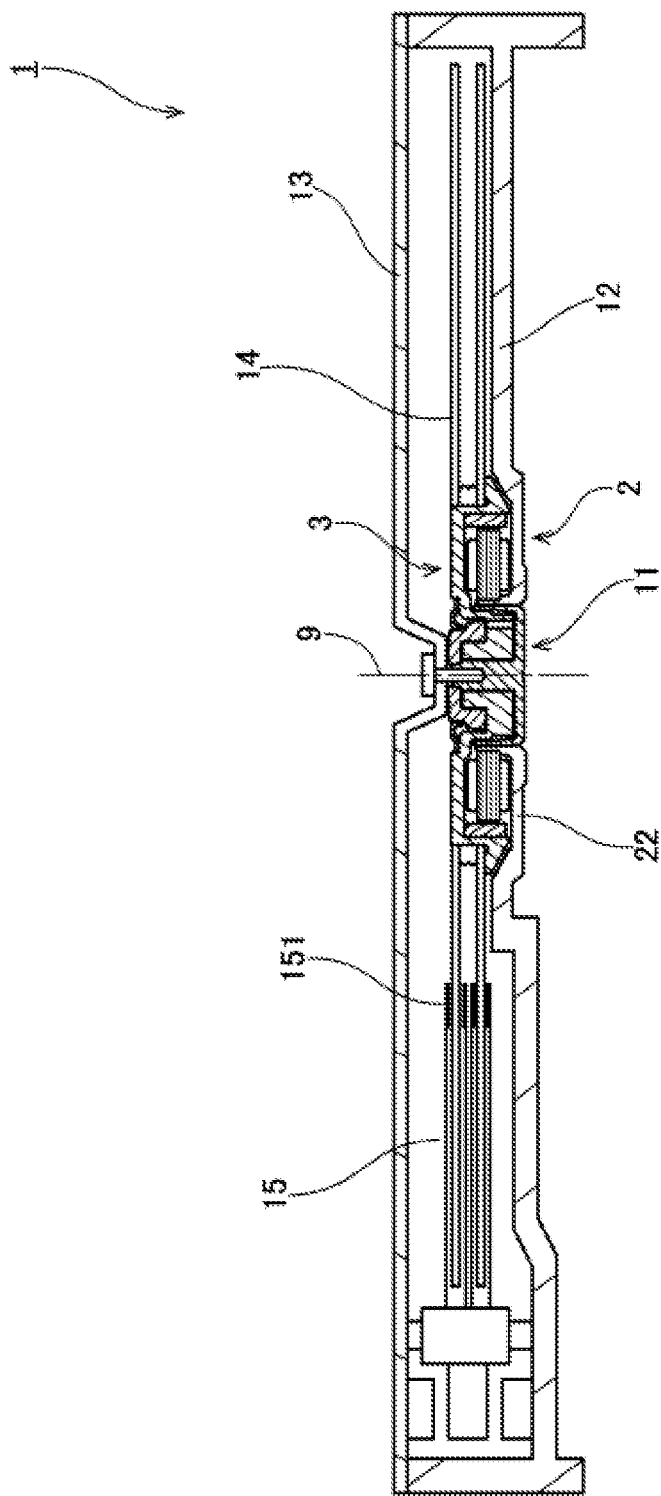
FIG. 2 is a vertical cross-sectional view of a disk drive apparatus according to a second preferred embodiment of the present invention.

FIG. 2 is a vertical cross-sectional view of a disk drive apparatus 1 according to a second preferred embodiment of the present invention. The disk drive apparatus 1 is preferably an apparatus arranged to rotate magnetic disks 14 (hereinafter referred to simply as the "disks 14") and perform reading and/or writing of information from or to the disks 14. Referring to FIG. 2, the disk drive apparatus 1 preferably includes a spindle motor 11, an apparatus housing 12, a cover 13, the disks 14, which preferably are two in number, for example, and an access portion 15.

The spindle motor 11 is arranged to rotate the disks 14 about a central axis 9 while supporting the disks 14. The spindle motor 11 preferably includes a rotating portion 3 and a stationary portion 2 including a base portion 22. The base portion 22 is a portion of the apparatus housing 12, and is defined integrally with a remaining portion of the apparatus housing 12.

The cover 13 is arranged to cover an upper opening of the apparatus housing 12.

The rotating portion 3 of the spindle motor 11, the two disks 14, and the access portion 15 are accommodated in a case defined by the cover 13 and the apparatus housing 12, which includes the base portion 22.

The disks 14 are supported by the rotating portion 3 of the spindle motor 11. Once the spindle motor 11 is driven, the disks 14 are caused to rotate together with the rotating portion 3.

The access portion 15 is arranged to move heads 151 along recording surfaces of the disks 14 and perform reading and writing of information from or to the disks 14. Note that the access portion 15 may be arranged to perform only one of the reading and writing of information from or to the disks 14 if so desired.

Also note that the number of disks 14 included in the disk drive apparatus 1 may be one or more than two.

Figure 3:
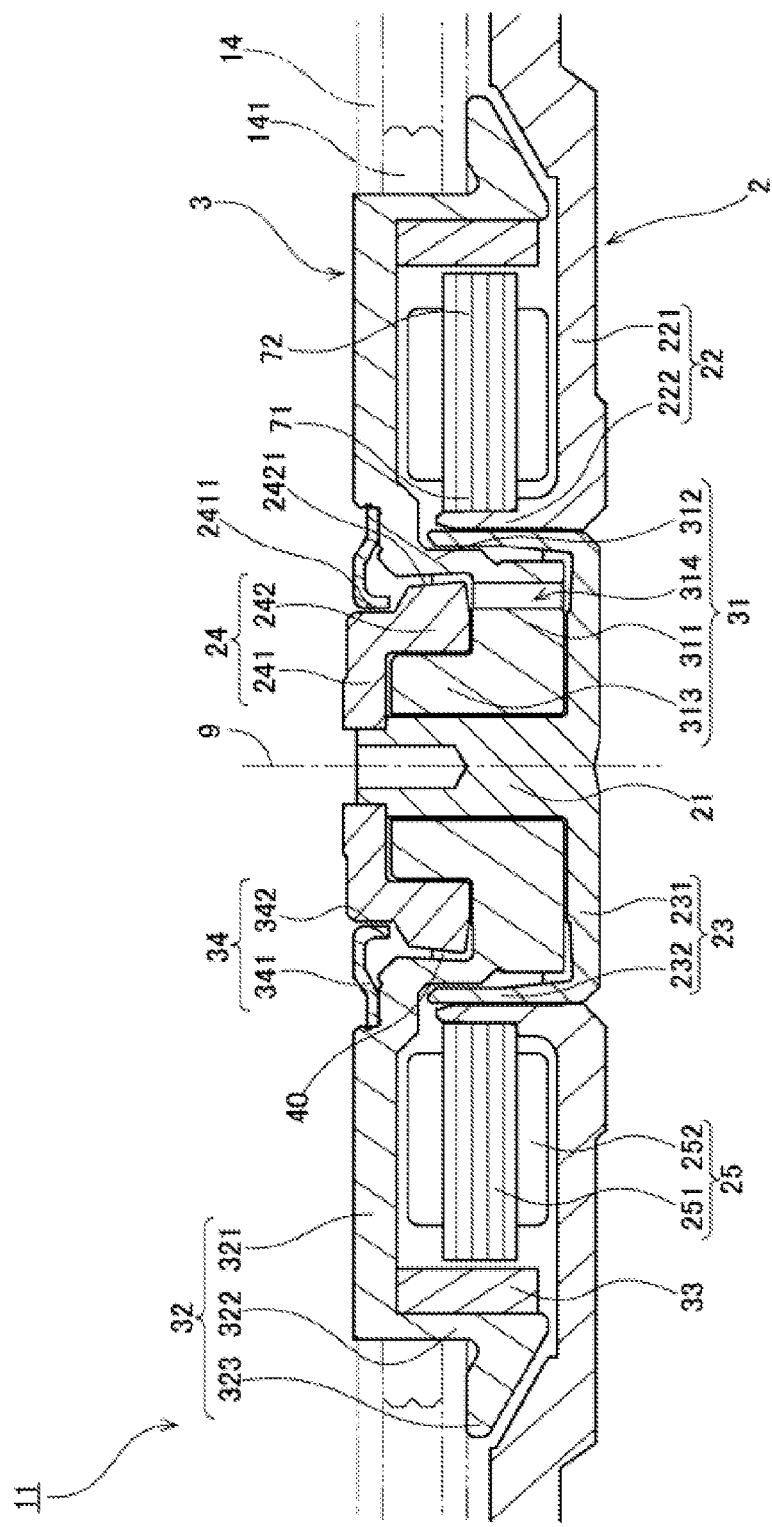
FIG. 3 is a vertical cross-sectional view of a spindle motor according to the second preferred embodiment of the present invention.
Figure 4:
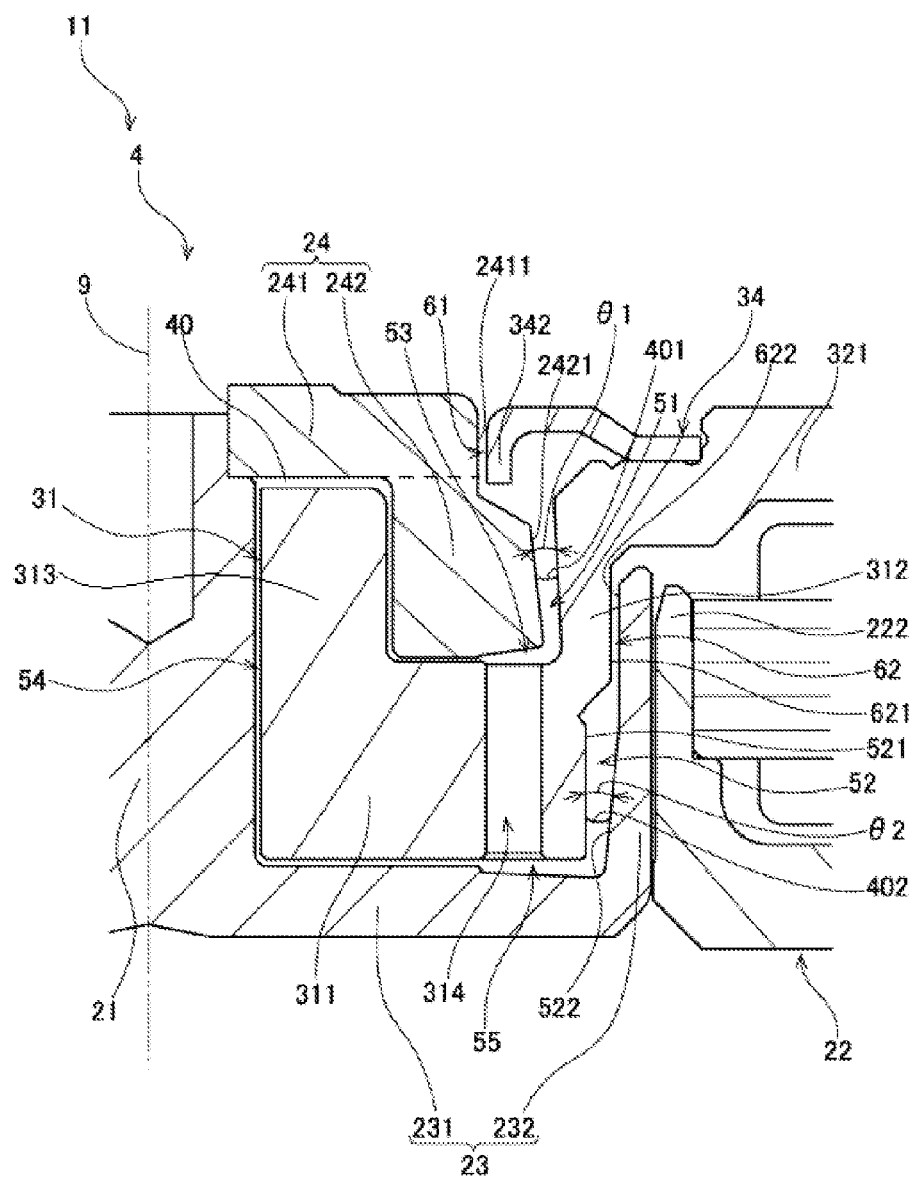
FIG. 4 is a partial vertical cross-sectional view of the spindle motor according to the second preferred embodiment of the present invention.

Next, the structure of the above-described spindle motor 11 will now be described below. FIG. 3 is a vertical cross-sectional view of the spindle motor 11. FIG. 4 is a partial vertical cross-sectional view of the spindle motor 11. Referring to FIG. 3, the spindle motor 11 includes the stationary portion 2, which is stationary relative to the apparatus housing 12 of the disk drive apparatus 1, and the rotating portion 3, which is arranged to rotate about the central axis 9 while supporting the disks 14.

The stationary portion 2 preferably includes a shaft 21, the base portion 22, a cup portion 23, a plate portion 24, and a stator unit 25.

The shaft 21 is arranged to extend along the central axis 9 extending in the vertical direction, and is columnar or substantially columnar in shape. The plate portion 24 is fixed to an upper end portion of the shaft 21. In addition, the cup portion 23 is arranged on a lower end portion of the shaft 21. The shaft 21 is preferably made of, for example, a metal such as stainless steel.

Referring to FIG. 2, the upper end portion of the shaft 21 is fixed to the cover 13 of the disk drive apparatus 1. The lower end portion of the shaft 21 is fixed to the base portion 22 through the cup portion 23.

As described above, the base portion 22 is a portion of the apparatus housing 12 of the disk drive apparatus 1 (see FIG. 2), and is defined integrally with the remaining portion of the apparatus housing 12. Note that the base portion 22 and the apparatus housing 12 may be defined by separate members. The base portion 22 includes a bottom plate portion 221 arranged to extend radially, and a cylindrical or substantially cylindrical holder portion 222 arranged to project upward from an inner edge of the bottom plate portion 221. The base portion 22 is preferably made of, for example, a metal such as an aluminum alloy.

The cup portion 23 is a portion in the shape of a circular or substantially circular ring and arranged on the lower end portion of the shaft 21. In the present preferred embodiment, the shaft 21 and the cup portion 23 are preferably defined by a single continuous monolithic member. Note that the shaft 21 and the cup portion 23 may alternately be defined by separate members if so desired.

The cup portion 23 preferably includes a circular or substantially circular plate portion 231 arranged to extend radially outward from the shaft 21, and a cylindrical or substantially cylindrical wall portion 232 arranged to extend upward from an outer edge of the circular plate portion 231. The wall portion 232 is fixed to an inner circumferential surface of the holder portion 222 of the base portion 22. The cup portion is arranged to assume or substantially assume the shape of the letter "L" in a vertical section with the circular plate portion 231 and the wall portion 232.

The plate portion 24 is a member that preferably has a circular or substantially circular ring shape, and is fixed to an outer circumferential surface of the shaft 21. The plate portion 24 is arranged to surround the shaft 21 above the circular plate portion 231 of the cup portion 23. The plate portion 24 is preferably, for example, press fitted to the upper end portion of the shaft 21, and is at the same time fixed to the shaft 21 through, for example, an adhesive. Note that the shaft 21 and the plate portion 24 may be defined by a single continuous monolithic member if so desired.

The plate portion 24 according to the present preferred embodiment preferably includes a flat plate portion 241 and an annular projecting portion 242. The flat plate portion 241 is fixed to the outer circumferential surface of the shaft 21, and is arranged to extend radially outward from the shaft 21. The annular projecting portion 242 is arranged to extend downward from an outer edge of the flat plate portion 241 to assume a cylindrical or substantially cylindrical shape. More specifically, the annular projecting portion 242 is arranged to extend downward from a lower surface of an outer edge portion of the flat plate portion 241.

In the present preferred embodiment, the annular projecting portion 242 refers to a portion of the plate portion 24 which is on a lower side of an imaginary plane which is a radially outward extension of a lower surface of the flat plate portion 241. Therefore, the flat plate portion 241 preferably includes a "flat plate portion outer circumferential surface" 2411 arranged to define a portion of an upper labyrinth seal portion 61, which will be described below. The annular projecting portion 242 preferably includes an "annular projecting portion outer circumferential surface" 2421 arranged to define a portion of an upper capillary seal portion 51, which will be described below.

Note that the annular projecting portion may refer to a portion of the plate portion 24 which is on a radially outer side of an imaginary plane which is an axially upward extension of an inner circumferential surface of the annular projecting portion 242 according to the present preferred embodiment. In this case, the annular projecting portion preferably includes both an outer circumferential surface which defines a portion of the upper labyrinth seal portion 61, and an outer circumferential surface which defines a portion of the upper capillary seal portion 51.

The stator unit 25 includes a stator core 251 and a plurality of coils 252. The stator core 251 includes a core back 71 in the shape of a circular ring, and a plurality of teeth 72. The core back 71 is fixed to an outer circumferential surface of the holder portion 222 of the base portion 22. The teeth 72 are arranged to project radially outward from the core back 71. The stator core 251 is preferably defined by laminated steel sheets, that is, electromagnetic steel sheets placed one upon another in the axial direction, for example. Each coil 252 is preferably defined by a conducting wire wound around a separate one of the teeth 72.

The rotating portion 3 includes a sleeve 31, a hub 32, a rotor magnet 33, and a cap 34.

The sleeve 31 is arranged to rotate about the central axis 9 around the shaft 21. The sleeve 31 preferably includes an annular portion 311, an outer cylindrical portion 312, which corresponds to the cylindrical portion 312A illustrated in FIG. 1, an inner cylindrical portion 313, and a communicating hole 314. The annular portion 311 preferably has a circular or substantially circular ring shape. The annular portion 311 includes the communicating hole 314, which is arranged to extend in the axial direction from an upper surface to a lower surface thereof. The outer cylindrical portion 312 is a cylindrical or substantially cylindrical portion extending upward from an outer edge of the annular portion 311. The inner cylindrical portion 313 is a cylindrical or substantially cylindrical portion extending upward from an inner edge of the annular portion 311. An inner circumferential surface of the annular portion 311 and an inner circumferential surface of the inner cylindrical portion 313 together define a single continuous surface as an inner circumferential surface of the sleeve 31. The inner circumferential surface of the sleeve 31 and the outer circumferential surface of the shaft 21 are preferably arranged radially opposite to each other with a slight gap defined therebetween.

The annular portion 311 and the inner cylindrical portion 313 of the sleeve 31 are arranged axially between the flat plate portion 241 of the plate portion 24 and the circular plate portion 231 of the cup portion 23.

The hub 32 preferably includes a top plate portion 321, a tubular portion 322, and a flange portion 323. The top plate portion 321 is preferably a disk-shaped or substantially disk-shaped portion extending radially outward from an upper end of the outer cylindrical portion 312 of the sleeve 31. The tubular portion 322 is a cylindrical or substantially cylindrical portion extending downward from an outer edge of the top plate portion 321. The flange portion 323 is a portion projecting radially outward from a lower end of the tubular portion 322.

At least a portion of an outer circumferential surface of the tubular portion 322 defines a contact surface arranged to make contact with an inner circumferential portion of each of the two disks 14. An upper surface of the flange portion 323 defines a mounting surface on which the lower disk 14 is mounted. The lower disk 14 is mounted on the upper surface of the flange portion 323, and the upper disk 14 is mounted on a spacer 141 arranged on the lower disk 14. The inner circumferential portion of each disk 14 is brought into contact with the outer circumferential surface of the tubular portion 322, so that the radial position of each disk 14 is fixed. As described above, the tubular portion 322 and the flange portion 323 are arranged to together define a support portion to support the two disks 14.

In the present preferred embodiment, the sleeve 31 and the hub 32 are preferably defined by a single continuous monolithic member. The sleeve 31 and the hub 32 are preferably made of, for example, a metal such as ferromagnetic stainless steel. Note that the sleeve 31 and the hub 32 may alternatively be defined by separate members, if so desired.

The rotor magnet 33 is fixed to an inner circumferential surface of the tubular portion 322 of the hub 32. The rotor magnet 33 preferably has a circular or substantially circular ring shape and is centered on the central axis 9. An inner circumferential surface of the rotor magnet 33 is arranged radially opposite to an outer circumferential surface of each of the teeth 72 of the stator core 251. The inner circumferential surface of the rotor magnet 33 is a pole surface in which north and south poles alternate with each other.

The cap 34 is preferably an annular member fixed to an upper surface of the top plate portion 321 of the hub 32. The cap 34 is arranged above the upper capillary seal portion 51, which will be described below. The cap 34 is preferably obtained, for example, by subjecting a metal to press working. Note that the cap 34 may be obtained by another method, and may be a resin-molded article, if so desired. The cap 34 according to the present preferred embodiment preferably includes a plate-shaped portion 341 and a projecting portion 342. The plate-shaped portion 341 is arranged to extend radially to assume or substantially assume the shape of a disk. An outer end portion of the plate-shaped portion 341 is fixed to the top plate portion 321 of the hub 32. The projecting portion 342 is arranged to project downward from an inner edge of the plate-shaped portion 341. An inner circumferential surface of the projecting portion 342 is arranged radially opposite to an outer circumferential surface of the plate portion 24 with a slight gap defined therebetween.

Referring to FIG. 4, a lubricating oil 40 is arranged in a minute gap defined between the sleeve 31 and a combination of the shaft 21, the cup portion 23, and the plate portion 24. An oil including an ester as a main component, such as a polyolester oil or a diester oil, is preferably used as the lubricating oil 40, for example.

Referring to FIG. 3, the rotating portion 3 is supported to be rotatable with respect to the stationary portion through the lubricating oil 40. That is, in the present preferred embodiment, the shaft 21, the cup portion 23, the plate portion 24, the sleeve 31, and the lubricating oil 40 are arranged to together define a fluid bearing portion 4 arranged to join the stationary and rotating portions 2 and 3 to each other such that the rotating portion 3 is rotatable relative to the stationary portion 2.

In the spindle motor 11 as described above, once electrical drive currents are supplied to the coils 252 of the stationary portion 2, radial magnetic flux is generated around each of the teeth 72 of the stator core 251. Then, a circumferential torque is produced by interaction between the magnetic flux of the teeth 72 and that of the rotor magnet 33, so that the rotating portion 3 is caused to rotate about the central axis 9 with respect to the stationary portion 2. The disks 14 supported by the hub 32 are caused to rotate about the central axis 9 together with the rotating portion 3.

Next, the structure of the fluid bearing portion 4 will now be further described below with reference to FIGS. 3 and 4.

Referring to FIG. 4, the fluid bearing portion 4 preferably includes the upper capillary seal portion 51, a lower capillary seal portion 52, a first gap 53, a second gap 54, a third gap 55, the upper labyrinth seal portion 61, and a lower labyrinth seal portion 62.

The upper capillary seal portion 51 is preferably defined by the annular projecting portion outer circumferential surface 2421, which is an outer circumferential surface of the annular projecting portion 242, and an inner circumferential surface of the outer cylindrical portion 312 of the sleeve 31. That is, the annular projecting portion outer circumferential surface 2421 is arranged radially opposite to the inner circumferential surface of the outer cylindrical portion 312 with the upper capillary seal portion 51 intervening therebetween. In addition, the upper capillary seal portion 51 is arranged to gradually decrease in radial width with decreasing height.

In the present preferred embodiment, the plate portion includes the flat plate portion 241 and the annular projecting portion 242 arranged to extend downward. The sleeve includes the annular portion 311, the outer cylindrical portion 312, the inner cylindrical portion 313, and the communicating hole 314. The cup portion 23 includes the circular plate portion 231 and the wall portion 232. This enables the upper capillary seal portion 51 to have a larger axial dimension than in the case where the plate portion 24 is defined by only the flat plate portion 241. This in turn makes it possible to reduce the axial thickness of the spindle motor 11.

Referring to FIG. 4, the sleeve 31 preferably includes a first outer circumferential surface 521 and a second outer circumferential surface 621. More specifically, the annular portion 311 of the sleeve 31 includes the first outer circumferential surface 521, while the outer cylindrical portion 312 of the sleeve 31 includes the second outer circumferential surface 621. The second outer circumferential surface 621 is arranged axially above the first outer circumferential surface 521. In addition, the wall portion 232 preferably includes a first inner circumferential surface 522 and a second inner circumferential surface 622. The first inner circumferential surface 522 is defined in a lower portion of an inner circumferential surface of the wall portion 232. The second inner circumferential surface 622 is arranged axially above the first inner circumferential surface 522.

Note that the outer cylindrical portion may include both the first outer circumferential surface 521, which is arranged to define a portion of the lower capillary seal portion 52, and the second outer circumferential surface 621, which is arranged to define a portion of the lower labyrinth seal portion 62.

The lower capillary seal portion 52 is defined by the first outer circumferential surface 521 and the first inner circumferential surface 522. That is, the first outer circumferential surface 521 is arranged radially opposite to the first inner circumferential surface 522 with the lower capillary seal portion 52 intervening therebetween. In addition, the lower capillary seal portion 52 is arranged to gradually decrease in radial width with decreasing height.

The first gap 53 is defined by a lower surface of the annular projecting portion 242 and the upper surface of the annular portion 311. The second gap 54 is defined by the outer circumferential surface of the shaft 21 and the inner circumferential surface of the sleeve 31. The third gap 55 is defined by the lower surface of the annular portion 311 and an upper surface of the circular plate portion 231. The first and third gaps 53 and 55 are arranged to be in axial communication with each other through the communicating hole 314.

One of the lower surface of the annular projecting portion 242 and the upper surface of the annular portion 311 preferably includes an upper thrust dynamic pressure groove array (not shown) at an inner portion of the first gap 53. The upper thrust dynamic pressure groove array is preferably, for example, an array of grooves arranged in a spiral pattern, an array of grooves arranged in a herringbone pattern, etc. During driving of the spindle motor 11, the upper thrust dynamic pressure groove array induces a dynamic pressure on the lubricating oil 40, so that an upper thrust dynamic pressure bearing is defined in the first gap 53. In addition, one of the upper surface of the circular plate portion 231 and the lower surface of the annular portion 311 includes a lower thrust dynamic pressure groove array (not shown) at an inner portion of the third gap 55. The lower thrust dynamic pressure groove array is preferably, for example, an array of grooves arranged in a spiral pattern, an array of grooves arranged in a herringbone pattern, etc. During the driving of the spindle motor 11, the lower thrust dynamic pressure groove array induces a dynamic pressure on the lubricating oil 40, so that a lower thrust dynamic pressure bearing is defined in the third gap 55. The rotating portion 3 is arranged to rotate while being axially supported by the upper and lower thrust dynamic pressure bearings.

In addition, one of the inner circumferential surface of the sleeve 31 and the outer circumferential surface of the shaft 21 includes a radial dynamic pressure groove array (not shown) at the second gap 54. The radial dynamic pressure groove array is preferably, for example, an array of grooves arranged in a herringbone pattern. During the driving of the spindle motor 11, the radial dynamic pressure groove array induces a dynamic pressure on the lubricating oil 40, so that a radial dynamic pressure bearing is defined in the second gap 54. The rotating portion 3 is arranged to rotate while being radially supported by the radial dynamic pressure bearing. Note that the number of radial dynamic pressure bearings defined in the second gap 54 may alternatively be either one or more than one.

As described above, the lubricating oil 40 is arranged in the minute gap defined between the sleeve 31 and the combination of the shaft 21, the cup portion 23, and the plate portion 24. That is, the lubricating oil 40 is arranged in a space including the upper capillary seal portion 51, the first gap 53, the second gap 54, the third gap 55, the communicating hole 314, and the lower capillary seal portion 52 between the stationary and rotating portions 2 and 3.

When the spindle motor 11 is in a stationary state, an upper surface 401 of the lubricating oil 40 is located in the upper capillary seal portion 51. In addition, when the spindle motor 11 is in the stationary state, a lower surface 402 of the lubricating oil 40 is located in the lower capillary seal portion 52. Each of the upper and lower surfaces 401 and 402 of the lubricating oil 40 thus defines a meniscus because of surface tension. This contributes to preventing the lubricating oil 40 from leaking through the upper surface 401 or the lower surface 402.

An outer circumferential portion of the first gap 53 is preferably arranged to gradually increase in axial width with increasing distance from the central axis 9. Similarly, an outer circumferential portion of the third gap 55 is preferably arranged to gradually increase in axial width with increasing distance from the central axis 9. This enables any air bubbles generated in the lubricating oil 40 in the first gap 53 or the third gap 55 to be carried toward the upper capillary seal portion 51 or the lower capillary seal portion 52. That is, the likelihood that any air bubbles will stay in the first gap 53 or the third gap 55 is reduced, and an improvement in efficiency in the discharging of air bubbles is achieved.

The upper labyrinth seal portion 61 is preferably defined by the flat plate portion outer circumferential surface 2411 and the inner circumferential surface of the projecting portion 342. As described above, the flat plate portion outer circumferential surface 2411 and the inner circumferential surface of the projecting portion 342 are preferably arranged radially opposite to each other with the slight gap intervening therebetween. Thus, the entrance and exit of gas through the gap between the flat plate portion outer circumferential surface 2411 and the inner circumferential surface of the projecting portion 342 is limited. This contributes to reducing evaporation of the lubricating oil 40 through the upper surface 401.

In the present preferred embodiment, the upper labyrinth seal portion 61 is arranged radially inward of the upper capillary seal portion 51. A reduction in the distance between the upper labyrinth seal portion 61 and the central axis 9 is thus achieved, and a reduction in the area of an opening of the gap in the upper labyrinth seal portion 61 is also achieved. This contributes to further reducing entrance and exit of a gas through the upper labyrinth seal portion 61. This in turn contributes to further reducing the evaporation of the lubricating oil 40 through the upper surface 401.

The above-described arrangement enables an inner circumferential surface of the cap 34 to have a greater axial dimension than in the case where the projecting portion 342 is not provided. This enables the upper labyrinth seal portion 61 to have an increased axial dimension. This contributes to further reducing the entrance and exit of gas through the upper labyrinth seal portion 61. This in turn contributes to further reducing the evaporation of the lubricating oil 40 through the upper surface 401.

The lower labyrinth seal portion 62 is preferably defined by the second outer circumferential surface 621 and the second inner circumferential surface 622. The second outer circumferential surface 621 and the second inner circumferential surface 622 are arranged radially opposite to each other with a slight gap defined therebetween. Thus, the entrance and exit of gas through the gap between the second outer circumferential surface 621 and the second inner circumferential surface 622 is limited. This contributes to reducing evaporation of the lubricating oil 40 through the lower surface 402.

As described above, in the present preferred embodiment, the sleeve 31 preferably includes the second outer circumferential surface 621, which is arranged to define the lower labyrinth seal portion 62, above the first outer circumferential surface 521, which is arranged to define the lower capillary seal portion 52. That is, the sleeve 31 according to the present preferred embodiment preferably is a single continuous monolithic member including both the first and second outer circumferential surfaces 521 and 621. This arrangement prevents a relative displacement between the first and second outer circumferential surfaces 521 and 621 more effectively than in the case where separate members including the first outer circumferential surface 521 and the second outer circumferential surface 621, respectively, are provided. An improvement in accuracy with which each of the lower capillary seal portion 52 and the lower labyrinth seal portion 62 is defined is thus achieved.

In addition, as described above, in the present preferred embodiment, the wall portion 232 includes the second inner circumferential surface 622, which is arranged to define the lower labyrinth seal portion 62, above the first inner circumferential surface 522, which is arranged to define the lower capillary seal portion 52. That is, the wall portion 232 according to the present preferred embodiment preferably is a single continuous monolithic member including both the first and second inner circumferential surfaces 522 and 622. This arrangement prevents a relative displacement between the first and second inner circumferential surfaces 522 and 622 more effectively than in the case where separate members including the first inner circumferential surface 522 and the second inner circumferential surface 622, respectively, are provided.

An additional improvement in the accuracy with which each of the lower capillary seal portion 52 and the lower labyrinth seal portion 62 is defined is thus achieved.

Note that, although the lower labyrinth seal portion 62 is preferably defined by an outer circumferential surface of the sleeve 31 and the inner circumferential surface of the wall portion 232 in the present preferred embodiment, this is not essential to the present invention. The lower labyrinth seal portion 62 may alternatively be defined by, for example, the outer circumferential surface of the sleeve 31 and the inner circumferential surface of the holder portion 222 of the base portion 22.

Referring to FIG. 4, in the present preferred embodiment, the upper capillary seal portion 51 is preferably arranged radially inward of both the lower capillary seal portion 52 and the lower labyrinth seal portion 62. In addition, the upper capillary seal portion 51 and the lower labyrinth seal portion 62 are preferably arranged to radially overlap with each other at least in part. This contributes to further reducing the axial thickness of the spindle motor 11 while securing sufficient lengths of the upper capillary seal portion 51, the lower capillary seal portion 52, and the lower labyrinth seal portion 62.

Here, an angle defined between the annular projecting portion outer circumferential surface 2421 and the inner circumferential surface of the outer cylindrical portion 312, which together define the upper capillary seal portion 51, in a section taken along a plane including the central axis 9 is referred to as a first angle $\theta 1$. In addition, an angle defined between the first outer circumferential surface 521 and the first inner circumferential surface 522, which together define the lower capillary seal portion 52, in a section taken along the plane including the central axis 9 is referred to as a second angle $\theta 2$.

In the present preferred embodiment, the first angle $\theta_1$ is preferably in a range of about 1 degree to about 8 degrees, whereas the second angle $\theta_2$ is preferably in a range of about 1 degree to about 10 degrees, for example. The first angle $\theta_1$ is more preferably in a range of about 2 degrees to about 6 degrees, whereas the second angle $\theta_2$ is more preferably in a range of about 3 degrees to about 8 degrees, for example. The first angle $\theta_1$ is most preferably in a range of about 2 degrees to about 4 degrees, whereas the second angle $\theta_2$ is most preferably in a range of about 4.5 degrees to about 6.5 degrees, for example. These specific relationships contribute to reducing both the range of variation in the level of the upper surface 401 in the upper capillary seal portion 51 and the range of variation in the level of the lower surface 402 in the lower capillary seal portion 52.

Referring to FIG. 4, in the spindle motor 11, in particular, the upper capillary seal portion 51 is preferably arranged to have a maximum radial width smaller than that of the lower capillary seal portion 52. In addition, the upper capillary seal portion 51 is preferably arranged to have an axial length smaller than that of the lower capillary seal portion 52. Moreover, in the present preferred embodiment, the first angle $\theta_1$ is arranged to be smaller than the second angle $\theta_2$. This makes the range of variation in the level of the lower surface 402 in the lower capillary seal portion 52 smaller than the range of variation in the level of the upper surface 401 in the upper capillary seal portion 51. This in turn contributes to more effectively preventing the lubricating oil 40 from leaking through the lower capillary seal portion 51.

In the present preferred embodiment, the capacity of a portion of the upper capillary seal portion 51 which is on an upper side of the upper surface 401 is preferably arranged to be smaller than the capacity of a portion of the lower capillary seal portion 52 which is on an upper side of the lower surface 402. In other words, a margin portion of the lower capillary seal portion 52 is preferably arranged to be larger than a margin portion of the upper capillary seal portion 51. This contributes to more effectively preventing the lubricating oil 40 from leaking through the lower capillary seal portion 52.

The structure of the spindle motor 11 according to the present preferred embodiment is thus able to achieve reduced axial dimension of the entire spindle motor 11 while effectively preventing the lubricating oil 40 from leaking through the lower capillary seal portion 52.

It is structurally easier to recognize the level of the upper surface 401 of the lubricating oil 40 in the upper capillary seal portion 51 through visual inspection, measurement, or the like at the time of injection of the lubricating oil 40 than the level of the lower surface 402 of the lubricating oil 40 in the lower capillary seal portion 52. In particular, in the present preferred embodiment, it is difficult to recognize the lower surface 402 at the time of the injection of the lubricating oil 40 because the lower capillary seal portion 52 and the lower labyrinth seal portion 62 are defined by the same members, and moreover, the sleeve 31 and the hub 32 are defined integrally with each other. Even if the sleeve 31 and the hub 32 are defined by separate members, the sleeve 31 and the hub 32 may be fixed to each other to together define a single united integral body before the injection of the lubricating oil 40. Also in this case, it is difficult to recognize the lower surface 402 in the lower capillary seal portion 52 at the time of the injection of the lubricating oil 40. Therefore, the present invention, which achieves a reduction in the likelihood that the lubricating oil 40 will leak through the lower capillary seal portion 52 with the above-described structure, is particularly useful to the spindle motor 11 as described above.

Referring to FIG. 4, in the present preferred embodiment, the inner circumferential surface of the outer cylindrical portion 312, which is arranged to define the upper capillary seal portion 51, is preferably arranged to be angled radially inward with increasing height. In addition, the annular projecting portion outer circumferential surface 2421 is also preferably arranged to be angled radially inward with increasing height. That is, the upper capillary seal portion 51 is arranged to be angled radially inward with increasing height. Accordingly, during the driving of the spindle motor 11, a centrifugal force which acts toward a lower end of the upper capillary seal portion 51 is applied to the lubricating oil 40 in the upper capillary seal portion 51. This contributes to preventing the lubricating oil 40 from leaking out of the spindle motor 11 through the upper capillary seal portion 51. In addition, the above arrangements make it possible to secure a sufficient radial thickness of an upper portion of the outer cylindrical portion 312. This contributes to securing a sufficient radial thickness and a sufficient strength of a portion in the vicinity of a boundary between the outer cylindrical portion 312 and the top plate portion 321 of the hub 32.

Moreover, in the present preferred embodiment, the lower capillary seal portion 52 is preferably arranged radially outward of the upper capillary seal portion 51. The first outer circumferential surface 521, which is arranged to define the lower capillary seal portion 52, is preferably parallel to the central axis 9. Meanwhile, the first inner circumferential surface 522, which is arranged to define the lower capillary seal portion 52, is preferably arranged to be angled radially outward with increasing height. This contributes to securing a sufficient radial thickness and a sufficient strength of a portion of the sleeve 31 in the vicinity of a boundary between the annular portion 311 and the outer cylindrical portion 312.

While preferred embodiments of the present invention have been described above, it is to be understood that the present invention is not limited to the above-described preferred embodiments.

Figure 5:
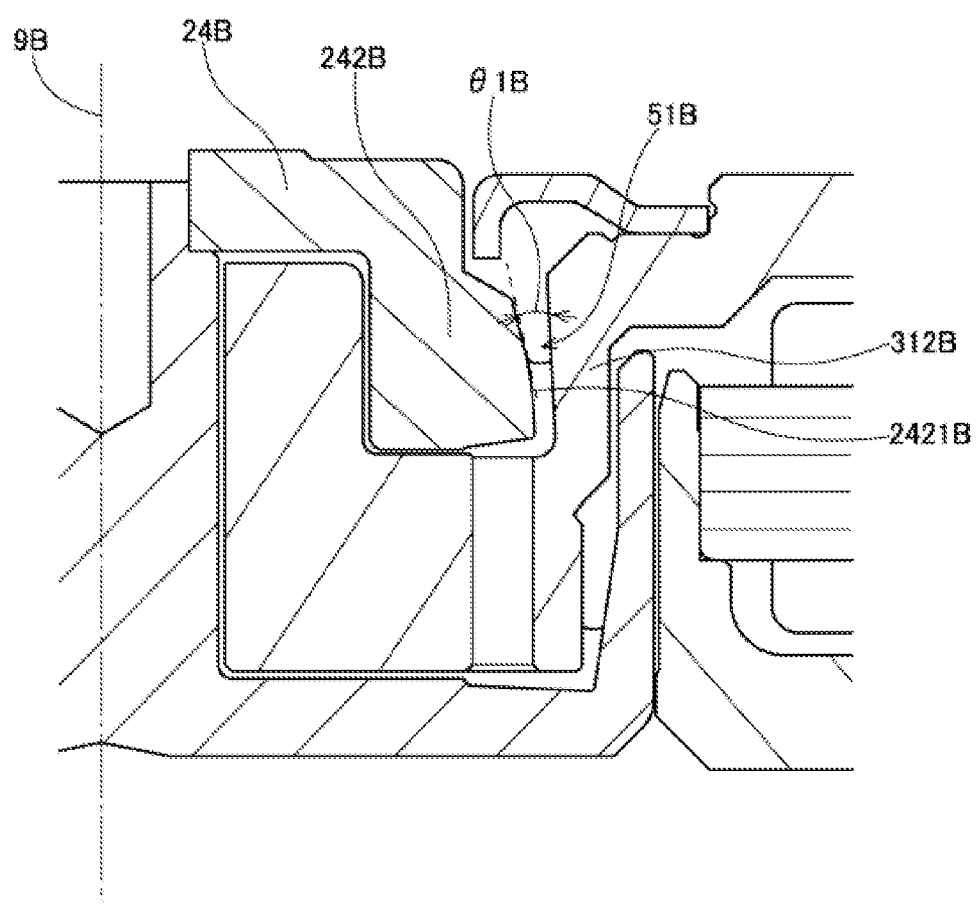
FIG. 5 is a partial vertical cross-sectional view of a spindle motor according to a modification of the second preferred embodiment of the present invention.

FIG. 5 is a partial vertical cross-sectional view of a spindle motor according to a modification of the second preferred embodiment of the present invention. In the modification illustrated in FIG. 5, an annular projecting portion of the outer circumferential surface 2421B, which is an outer circumferential surface of an annular projecting portion 242B arranged in a lower portion of a plate portion 24B, is preferably a curved portion in a section taken along a plane including a central axis 9B. In this case, a first angle $\theta_1$B refers to an angle defined between a tangent to the annular projecting portion outer circumferential surface 2421B at any point and an inner circumferential surface of an outer cylindrical portion 312B in a section taken along the plane including the central axis 9B. In the modification illustrated in FIG. 5, an upper capillary seal portion 51B refers to an area where the first angle $\theta_1$B preferably is about 1 degree, an angle greater than about 1 degree and smaller than about 8 degrees, or about 8 degrees, for example. Referring to FIG. 5, each surface which defines each capillary seal portion may be a single curved portion or a line defined by a plurality of curves or straight lines having different angles in a section taken along the plane including the central axis 9B.

Figure 6:
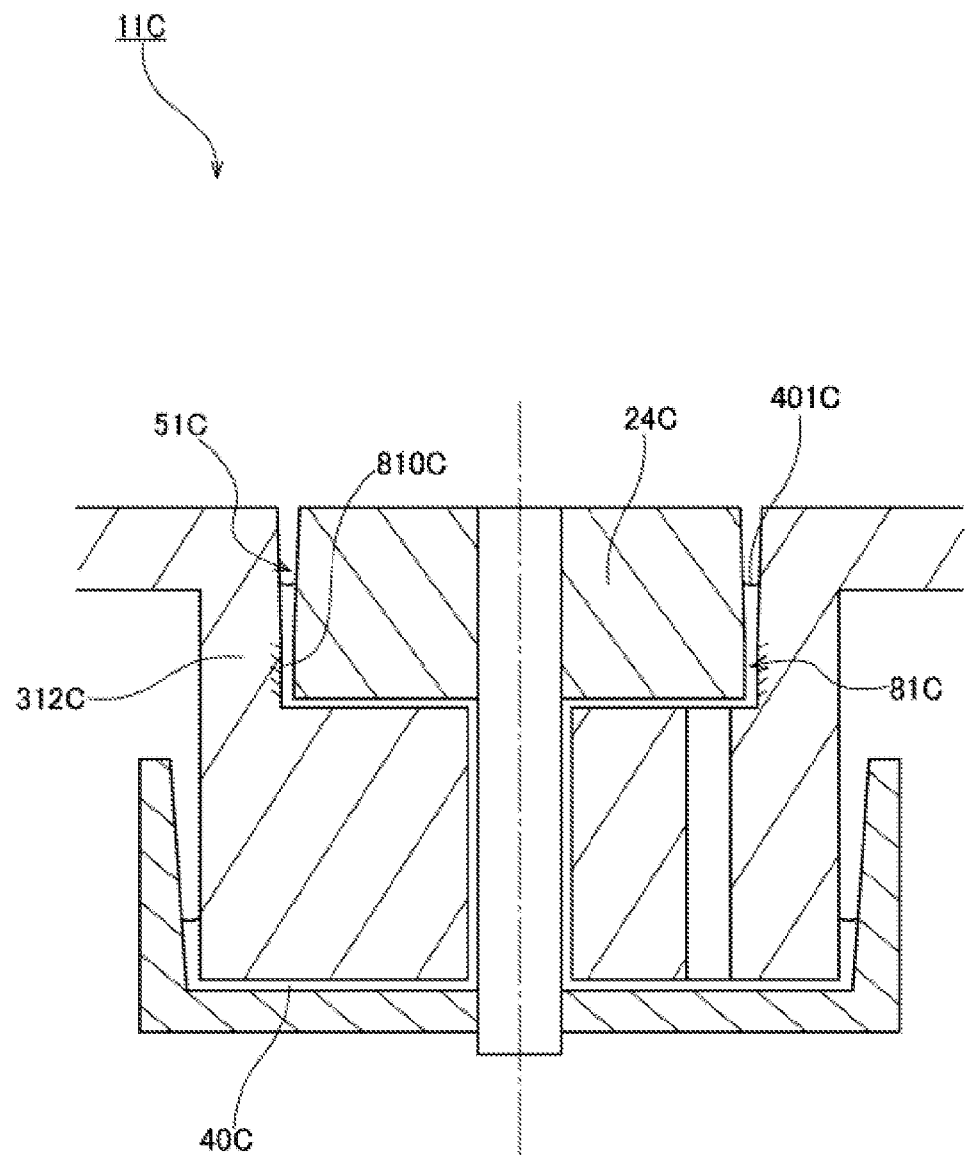
FIG. 6 is a partial vertical cross-sectional view of a spindle motor according to a modification of the first preferred embodiment of the present invention.

FIG. 6 is a partial vertical cross-sectional view of a spindle motor 11C according to a modification of the first preferred embodiment of the present invention. Referring to FIG. 6, a pumping seal portion 81C is preferably arranged below an upper capillary seal portion 51C. In the modification illustrated in FIG. 6, an inner circumferential surface of a cylindrical portion 312C preferably includes a belt-shaped groove portion 810C including a pumping groove array defined therein below the upper capillary seal portion 51C. The pumping seal portion 81C is defined by an outer circumferential surface of a plate portion 24C and the groove portion 810C. An upper end portion of the pumping seal portion 81C and a lower end portion of the upper capillary seal portion 51C are continuous with each other.

Once the cylindrical portion 312C rotates, a lubricating oil 40C is drawn downward by the groove portion 810C. As a result, an upper surface 401C of the lubricating oil 40C is moved downward relative to a level of the upper surface 401C illustrated in FIG. 6. This contributes to preventing the lubricating oil 40C from leaking through the upper capillary seal portion 51C. Pressure balance between the upper and lower surfaces of the lubricating oil is easily attained when a pumping seal portion is arranged below either of the upper and lower capillary seal portions as described above. Moreover, the pumping seal portion contributes to reducing the axial dimension of the capillary seal portion, and thus further reducing the thickness of the spindle motor. Note that the pumping groove array may alternatively be defined in the outer circumferential surface of the plate portion 24C instead of in the inner circumferential surface of the cylindrical portion 312C. Also note that the pumping groove arrays may be defined in both the inner circumferential surface of the cylindrical portion 312C and the outer circumferential surface of the plate portion 24C, if so desired.

Also note that, although the upper labyrinth seal portion is preferably defined by the outer circumferential surface of the plate portion and the inner circumferential surface of the cap according to the above-described second preferred embodiment, this is not essential to the present invention. For example, the upper labyrinth seal portion may be defined by the outer circumferential surface of the shaft and the inner circumferential surface of the cap.

Also note that the detailed shape of any member may be different from the shape thereof as illustrated in the accompanying drawings of the present application. Features of the above-described preferred embodiments and the modifications thereof may be combined appropriately as long as no conflict arises.

Preferred embodiments of the present invention and modifications thereof are applicable to spindle motors and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
a stationary portion including a shaft arranged to extend along a central axis extending in a vertical direction; and
a rotating portion supported to be rotatable about the central axis around the shaft;
wherein
the stationary portion includes:
the shaft;
a circular plate portion arranged to extend radially outward from the shaft;
a cylindrical or substantially cylindrical wall portion arranged to extend upward from an outer edge of the circular plate portion; and
a plate portion having a circular or substantially circular ring shape and arranged to surround the shaft above the circular plate portion;
the rotating portion includes a sleeve including an annular portion having a circular or substantially circular ring shape, a cylindrical portion arranged to extend upward from an outer edge of the annular portion, and a communicating hole arranged to pass through the annular portion in an axial direction;
an outer circumferential surface of the plate portion is arranged opposite to an inner circumferential surface of the cylindrical portion with an upper capillary seal portion defined therebetween, the upper capillary seal portion being arranged to gradually decrease in radial width with decreasing height;
an outer circumferential surface of the sleeve is arranged opposite to an inner circumferential surface of the wall portion with a lower capillary seal portion defined therebetween, the lower capillary seal portion being arranged to gradually decrease in radial width with decreasing height;
between the stationary and rotating portions, a lubricating oil is arranged in a space including:
the upper capillary seal portion;
a first gap defined between a lower surface of the plate portion and an upper surface of the sleeve;
a second gap defined between an outer circumferential surface of the shaft and an inner circumferential surface of the sleeve;
a third gap defined between a lower surface of the sleeve and an upper surface of the circular plate portion;
the communicating hole arranged to bring the first and third gaps into axial communication with each other; and
the lower capillary seal portion;
an upper surface of the lubricating oil is located in the upper capillary seal portion when the spindle motor is in a stationary state;
a lower surface of the lubricating oil is located in the lower capillary seal portion when the spindle motor is in the stationary state;
a first angle defined between the outer circumferential surface of the plate portion and the inner circumferential surface of the cylindrical portion at the upper capillary seal portion in a section taken along a plane including the central axis is in a range of about 1 degree to about 8 degrees;
a second angle defined between the outer circumferential surface of the sleeve and the inner circumferential surface of the wall portion at the lower capillary seal portion in a section taken along the plane including the central axis is in a range of about 1 degree to about 10 degrees;
the upper capillary seal portion is arranged to have a maximum radial width smaller than that of the lower capillary seal portion; and
the upper capillary seal portion is arranged to have an axial length smaller than that of the lower capillary seal portion.

2. The spindle motor according to claim 1, wherein
the plate portion includes:
a flat plate portion arranged to extend radially; and
an annular projecting portion arranged to extend downward from an outer edge of the flat plate portion; and
the upper capillary seal portion is defined by an outer circumferential surface of the annular projecting portion and the inner circumferential surface of the cylindrical portion.

3. The spindle motor according to claim 1, wherein the first angle is smaller than the second angle.

4. The spindle motor according to claim 1, wherein a portion of the inner circumferential surface of the cylindrical portion which defines the upper capillary seal portion is angled radially inward with increasing height.

5. The spindle motor according to claim 1, wherein
the lower capillary seal portion is arranged radially outward of the upper capillary seal portion;
a portion of the outer circumferential surface of the sleeve which defines the lower capillary seal portion parallel or substantially parallel to the central axis; and
a portion of the inner circumferential surface of the wall portion which defines the lower capillary seal portion angled radially outward with increasing height.

6. The spindle motor according to claim 1, wherein a portion of the upper capillary seal portion which is on an upper side of the upper surface of the lubricating oil has a capacity smaller than that of a portion of the lower capillary seal portion which is on an upper side of the lower surface of the lubricating oil.

7. The spindle motor according to claim 1, wherein
the rotating portion further includes a cap that has a circular or substantially circular ring shape and is arranged above the upper capillary seal portion; and
an inner circumferential surface of the cap and one of the outer circumferential surface of the shaft and the outer circumferential surface of the plate portion are arranged radially opposite to each other with a gap defined therebetween to together define an upper labyrinth seal portion.

8. The spindle motor according to claim 7, wherein
the cap includes:
a plate-shaped portion having a circular or substantially circular ring shape and arranged to extend radially; and
a projecting portion arranged to project downward from an inner edge of the plate-shaped portion; and
an inner circumferential surface of the projecting portion and one of the outer circumferential surface of the shaft and the outer circumferential surface of the plate portion are arranged to together define the upper labyrinth seal portion.

9. The spindle motor according to claim 7, wherein the upper labyrinth seal portion is arranged radially inward of the upper capillary seal portion.

10. The spindle motor according to claim 1, wherein
the wall portion includes:
a first inner circumferential surface arranged to define the lower capillary seal portion; and
a second inner circumferential surface arranged axially above the first inner circumferential surface; and
the outer circumferential surface of the sleeve and the second inner circumferential surface are arranged radially opposite to each other with a gap defined therebetween to together define a lower labyrinth seal portion.

11. The spindle motor according to claim 10, wherein
the upper capillary seal portion is arranged radially inward of the lower labyrinth seal portion; and
the upper capillary seal portion and the lower labyrinth seal portion are arranged to radially overlap with each other at least in part.

12. The spindle motor according to claim 1, wherein an outer circumferential portion of the first gap is arranged to gradually increase in axial width with increasing distance from the central axis.

13. The spindle motor according to claim 1, wherein an outer circumferential portion of the third gap is arranged to gradually increase in axial width with increasing distance from the central axis.

14. The spindle motor according to claim 1, wherein
the inner circumferential surface of the cylindrical portion includes a belt-shaped groove portion including a pumping groove array defined therein;
the outer circumferential surface of the plate portion and the groove portion are arranged to together define a pumping seal portion; and
an upper end portion of the pumping seal portion and a lower end portion of the upper capillary seal portion are continuous with each other.

15. A disk drive apparatus comprising;
the spindle motor of claim 1, the spindle motor including a base portion;
an access portion arranged to perform at least one of reading and writing of information from or to a disk supported by the rotating portion of the spindle motor; and
a cover arranged to define a case together with the base portion; wherein
the rotating portion and the access portion are accommodated in the case.

* * * * *